(12) United States Patent
Park

(10) Patent No.: US 6,493,301 B1
(45) Date of Patent: Dec. 10, 2002

(54) OPTICAL RECORDING MEDIUM AND METHOD OF MANAGING DEFECT AREA OF THE OPTICAL RECORDING MEDIUM

(75) Inventor: Yong Cheol Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/461,813

(22) Filed: Dec. 16, 1999

(30) Foreign Application Priority Data

Jan. 13, 1999 (KR) .................................... 99-731

(51) Int. Cl.$^7$ ................................................ G11B 5/09
(52) U.S. Cl. ................................ 369/53.15; 369/47.14
(58) Field of Search .......................... 369/47.14, 47.15, 369/53.15, 53.17, 53.2, 53.22, 5.24; 711/113, 115, 137, 156; 714/5, 8

(56) References Cited

U.S. PATENT DOCUMENTS 5,829,017 A * 10/1998 Ohtsuka ..................... 711/113
6,182,240 B1 * 1/2001 Mine .............................. 714/5
6,301,220 B1 * 10/2001 Takagi et al. ............... 369/53.2

* cited by examiner

Primary Examiner—Thang V. Tran
(74) Attorney, Agent, or Firm—Birch, Stewart, Kolasch & Birch, LLP

(57) ABSTRACT

A rewritable optical medium and a method of managing its defect area is disclosed. The DMA condition or initially assignable spare area size in the present invention is determined based upon the interrelation between the spare area size and the DMA condition. Namely, the PDL entry condition among the DMA condition is determined to allow a minimum spare area for linear replacement in the initially assignable spare area after slipping replacement during formatting to facilitate management of the defect area of a rewritable optical medium. The present invention also discloses a method of controlling the recording/playback of optical media with the same format and different sizes, thereby improving the system performance.

19 Claims, 5 Drawing Sheets

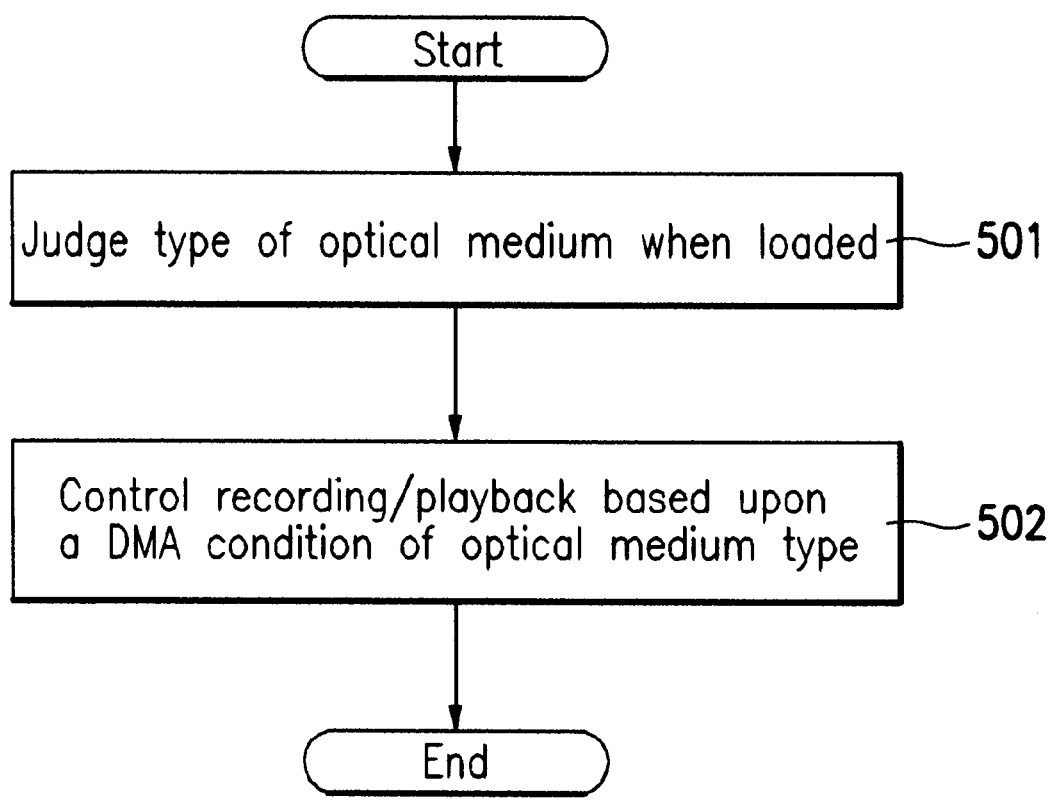

OPTICAL RECORDING MEDIUM AND METHOD OF MANAGING DEFECT AREA OF THE OPTICAL RECORDING MEDIUM

BACKGROUND OF THE INVENTION

1. Field of the Invention

The present invention relates to an optical recording medium and particularly to a method of managing the defect area and method of controlling the recording/playback operation of the optical recording medium.

2. Discussion of Related Art

An optical storage medium is generally divided into a read only memory (ROM), a write once read many (WORM) memory into which data can be written one time, and rewritable memories into which data can be written several times. Rewritable optical storage mediums, i.e. optical discs, include rewritable compact discs (CD-RW) and rewritable digital versatile discs (DVD-RW, DVD-RAM, DVD+RW).

The operations of writing and playing back data in a rewritable optical disc may be repeated. This repeated process alters the ratio of storage layers for recording data into the optical disc from the initial ratio. Thus, the optical discs lose their characteristics and generate an error during recording/playback. This degradation is indicated as a defective area at the time of formatting, recording on or playing back from an optical storage medium. Also, defective areas of a rewritable optical disc may be caused by a scratch on its surface, particles of dirt and dust, or errors during manufacture. Therefore, in order to prevent writing into or reading out of the defective area, management of such defective areas is necessary.

FIG. 1 shows a defect management area (DMA) in a lead-in area and a lead-out area of the optical disc to manage a defect area. Particularly, the data area is divided into a plurality of zones, where each zone is further divided into 'a user area' and 'a spare area.' The user area is where data is actually written and the spare area is used when a defect occurs in the user area.

There are four DMAs in one disc, e.g. DVD-RAM, two of which exist in the lead-in area and two exist in the lead-out area. Because managing defective areas is important, the same contents are repeatedly recorded in all four DMAs to protect the data. Each DMA comprises two blocks of 32 sectors, where one block comprises 16 sectors. The first block of the DMA, called a DDS/PDL block, includes a disc definition structure (DDS) and a primary defect list (PDL). The second block of the DMA, called an SDL block, includes a secondary defect list (SDL). The PDL corresponds to a primary defect data storage and the SDL corresponds to a secondary defect data storage.

The PDL generally stores entries of defective sectors caused during the manufacture of the disc or identified when formatting a disc, namely initializing and re-initializing a disc. Each entry is composed of an entry type field and a field for a sector number corresponding to a defective sector. The SDL lists defective areas in block units, thereby storing entries of defective blocks occurring after formatting or defective blocks which could not be stored in the PDL during the formatting. Each SDL entry has a field for storing a sector number of the first sector of a block having defective sectors, a field for storing a sector number of the first sector of a block replacing the defective block, and reserved areas. Accordingly, defective areas, i.e. defective sectors or defective blocks, within the data area are replaced with normal or non-defective sectors or blocks by a slipping replacement algorithm and a linear replacement algorithm.

The slipping replacement algorithm is utilized when a defective area is recorded in the PDL. As shown in FIG. 2A, if defective sectors m and n, corresponding to sectors in the user area, are recorded in the PDL, such defective sectors are skipped to the next available good sector. By replacing the defective sectors by subsequent good sectors, data is written to a normal sector. As a result, the user area into which user data is written slips and occupies the spare area in the amount equivalent to the skipped defective sectors. For example, if two defect sectors are registered in the PDL, the user data would slip and occupy two sectors of the spare area.

The linear replacement algorithm is utilized when a defective block is recorded in the SDL or when a defective block is found during playback. As shown in FIG. 2B, if defective blocks m and n, corresponding to blocks in either the user or spare area, are recorded on the SDL, such defective blocks are replaced by normal blocks in the spare area and the data to be recorded in the defective block are recorded in an assigned spare area.

As defective areas are compensated utilizing the spare area, methods of assigning the spare area play an important role in the defective area management. Typically, the spare area may be allocated in each zone or group of the data area or may be allocated in a designated portion of the data area.

One method of allocating the spare area is to allocate the spare area at the top of the data area, as shown in FIG. 3(a). In such case, the spare area is called a Primary Spare Area. Namely, the data area excluding the primary spare area becomes the user area.

The primary spare area, assigned in an initial formatting process, is assigned when a manufacturer produces the optical disc or when a user initially formats an empty disc. A variety of sizes can be allocated for the primary spare area. For example, in order to provide a 4.7 GB(Giga byte) initial data recording capacity (i.e. initial user area) in a disc with a size of 120 mm, 26 MB (Mega Byte) may be allocated for the primary spare area. Moreover, a supplementary spare area may be additionally assigned near the bottom of the data area, as shown in FIG. 3(b), if necessary.

When a rewritable optical disc is loaded, the defect information registered in the lead-in area (or lead-out area) of the DMA is first read and recorded in a specified location of the system memory of a drive. The maximum DMA storage capacity to store the defect information in the system memory of a drive, for example 32 KB (Kilo bytes), is predetermined. Thus, DMA processing conditions are given to satisfy the predetermined DMA storage capacity. The conditions are expressed below in Equation 1, where $S_{PDL}$ denotes the number of sectors used for maintaining the PDL entries, $S_{SDL}$ denotes the number of sectors used for maintaining the SDL entries, $E_{PDL}$ denotes the number of PDL entries, and $E_{SDL}$ denotes the number of SDL entries.

$$1 \leq S_{PDL} \leq 15 \text{ (or 16)}$$

$$1 \leq S_{SDL} \leq 15 \text{ (or 16)}$$

$$S_{PDL} + S_{SDL} \leq 16 \text{ sectors}$$

$$S_{PDL} = [(E_{PDL} \times 4 + 4) + 2027]/2048$$

$$S_{SDL} = [(E_{SDL} \times 8 + 24) + 2027]/2048 \qquad \text{[Equation 1]}$$

Referring to Equation 1, a DMA storage capacity which satisfies the conditions, $1 \leq S_{PDL} \leq 15$ and $1 \leq S_{SDL} \leq 15$, is 32

KB (2048*16). This is because one sector corresponds to 2048 Bytes and the number of total sectors which can be used for the PDL and SDL cannot exceed 16 sectors, i.e. $S_{PDL}+S_{SDL} \leq 16$ sectors. The DMA storage capacity satisfying the conditions, $1 \leq S_{PDL} \leq 16$ and $1 \leq S_{SDL} \leq 16$, is 64 KB (=(2048*16)+(2048*16)) because only one condition that the PDL or SDL cannot exceed 16 sectors is present. Thus, the DMA storage capacity varies with the DMA conditions.

However, during a formatting of an optical disc, an overflow may be caused by a limited number of entries which can be registered in the PDL according to Equation 1. This is because the DMA conditions do not take into consideration the size of the spare area. In other words, advancement of technology will continuously produce an optical recording medium with greater capacity or an optical recording media with the same format but different sizes and recording capacity. This would result in a variation of the standard, size and recording capacity of the optical medium. For each variation, the size of the spare area and the DMA condition should be determined for the new optical recording medium. Nevertheless, there has been no standard for determining the size of the spare area and DMA condition.

SUMMARY OF THE INVENTION

Accordingly, an object of the present invention is to solve at least the problems and disadvantages of the related art.

An object of the present invention is to provide a method of managing the defect area of an optical recording medium in consideration of the spare area size and the DMA condition.

Another object of the present invention is to provide a method of managing the defect area of an optical recording medium by determining the DMA condition using an interrelation between the spare area size and the DMA condition.

A still another object of the present invention is to provide a method of managing the defect area of an optical recording medium by determining the size of initially assignable spare area using the interrelation between the spare area size and the DMA condition.

A further another object of the present invention is to provide an optical recording medium in which the spare area is assigned in consideration of the interrelation between the spare area size and the DMA condition.

A still further object of the present invention is to provide a method of controlling recording/playback of an optical medium, which allows recording/playback of optical media of different conditions in a single system.

A still further object of the present invention is to provide a method of controlling recording/playback of an optical medium, which allows recording/playback of 120/80 mm optical media having the same format but different sizes in a single system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method of managing a defect area of an optical medium includes determining the size of the initially assignable spare area; and determining a PDL entry condition such that a spare area for linear replacement is left in the initially assignable spare area after the slipping replacement during a formatting. The PDL entry condition is determined by utilizing the interrelation between the initially assignable spare area size and the PDL entry condition.

The size of the initially assignable spare area is determined based upon the initial recording capacity and the PDL entry condition. A SDL entry condition is determined using the set PDL entry condition and a predetermined maximum spare area size. The SDL entry condition may also be determined using the set PDL entry condition and a predetermined DMA storage capacity. When the predetermined maximum spare area size is larger than the initially assignable spare area size, a separate spare area is additionally assigned as required.

To accomplish the objects of the present invention, there is also provided a method of managing a defect area of an optical medium in which a PDL entry condition is determined to allow a spare area for linear replacement to exist in the initially assignable spare area after slipping replacement during a formatting.

To accomplish the objects of the present invention, there is provided an optical medium in which a spare area is assigned to allow a spare area for linear replacement to exist in the initially assignable spare area after slipping replacement during formatting. In another embodiment of the present invention, a method of controlling the recording/playback of an optical medium is provided including judging the kind of the optical medium when an optical medium is loaded, and controlling the recording/playback of the optical medium based upon a DMA condition of the judged optical medium.

Furthermore, to accomplish the objects of the present invention, there is provided a method of controlling the recording/playback of an optical medium including judging if an optical medium has a diameter of 80 mm when an optical medium is loaded, and if it is judged to be an optical medium having the diameter of 80 mm, controlling the recording/playback operation on condition such that the number of sectors managed by a PDL among a DMA condition does not exceed 11.

BRIEF DESCRIPTION OF THE ATTACHED DRAWINGS

The invention will be described in detail with reference to the following drawings in which like reference numerals refer to like elements wherein:

FIG. 5 is a flow diagram for controlling the recording/playback of an optical recording medium according to an embodiment of the present invention.

DETAILED DESCRIPTION OF PREFERRED EMBODIMENT

Reference will now be made in detail to the preferred embodiments of the present invention, examples of which are illustrated in the accompanying drawings.

Figure 1:
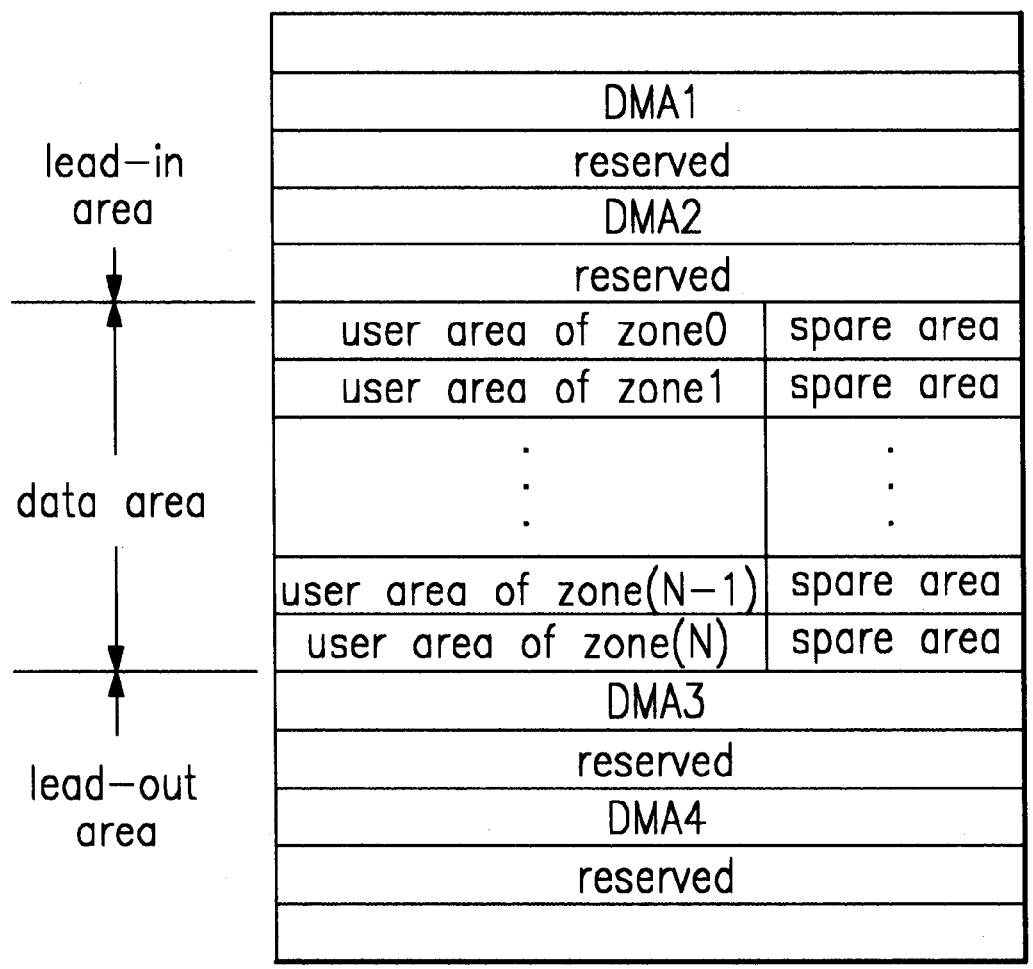
FIG. 1 shows the structure of a general optical recording medium.
Figure 2A:
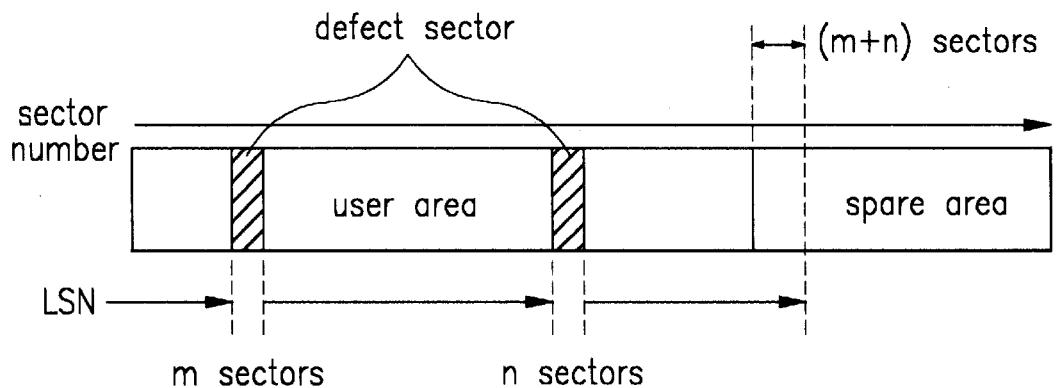
FIG. 2A shows a slipping replacement algorithm in the related art.
Figure 2B:
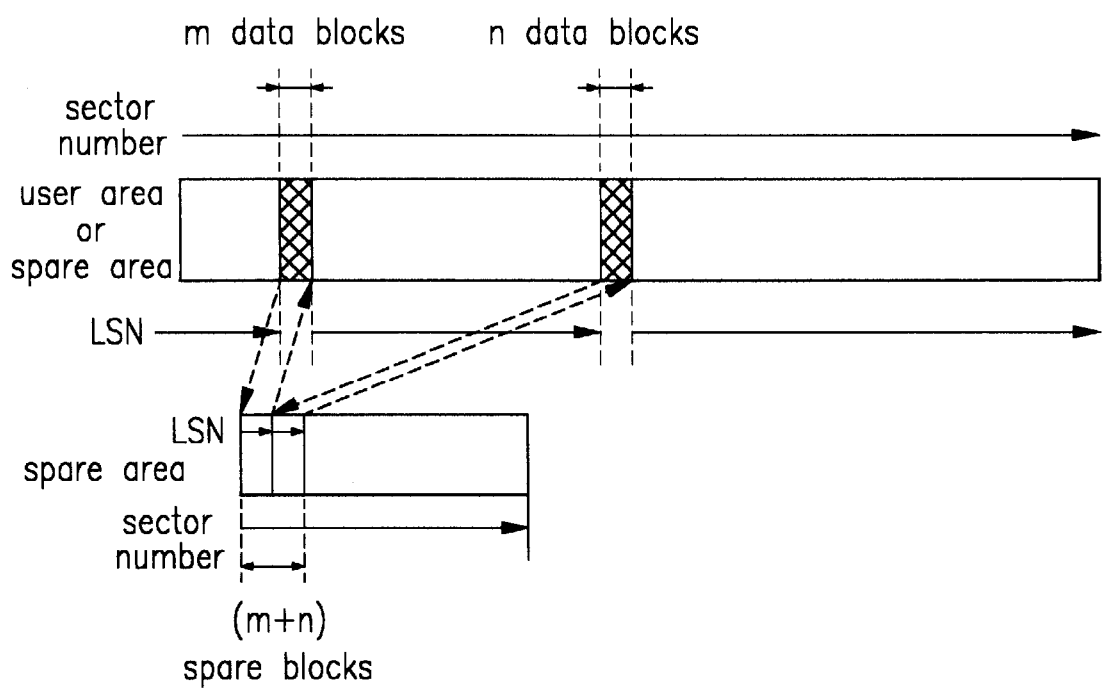
FIG. 2B shows a linear replacement algorithm in the related art.
Figure 3:
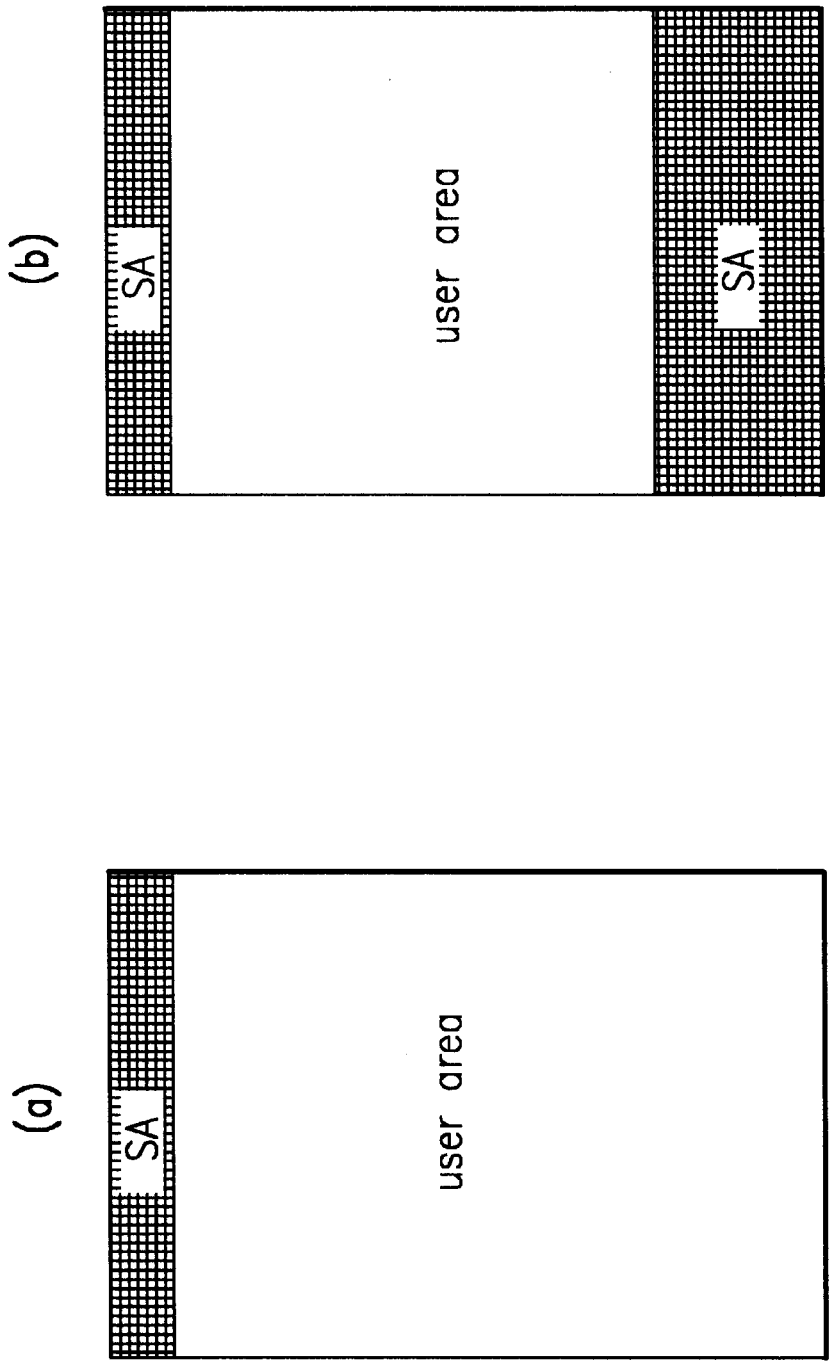
FIG. 3A shows an example in which a spare area is assigned at the top of the data area.
FIG. 3B shows an example in which a spare area is additionally assigned near the bottom of the data area.
Figure 4:
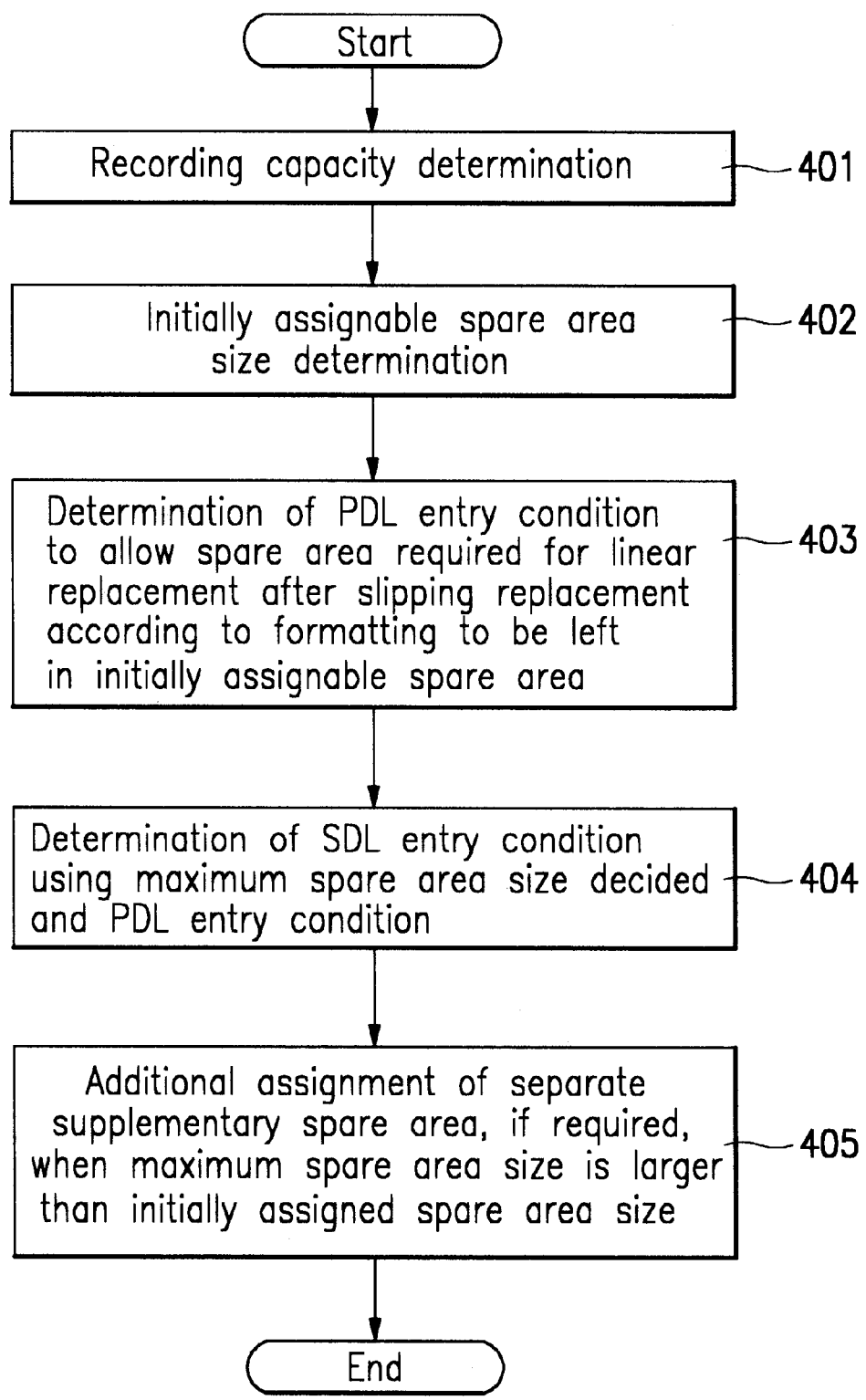
FIG. 4 is a flow diagram for managing a defect area of an optical recording medium according to an embodiment of the present invention.

Generally, the present invention determines the size of initially assignable spare area and/or the DMA condition based upon the interrelation between the size of the spare area and the DMA condition. FIG. 4 is a flow diagram showing a method of managing a defect area of an optical recording medium according to an embodiment of the present invention.

Referring to FIG. 4, in accordance with the present invention, the initial recording capacity of an optical recording medium is first determined while maintaining compatibility with the optical recording medium (step 401). Essentially in step 401, the user area capacity of the data area in which the actual data would be recorded is determined. Upon determining the initial recording capacity, the size of an initially assignable spare area is determined based upon the initial recording capacity (step 402). For example, the size of the initially assignable spare area, namely the primary spare area, can be obtained by subtracting the initial recording capacity from the total data area capacity. Thereafter, a PDL entry condition is set (step 403) such that a minimum size required for a linear replacement would be left in the initially assignable spare area after a slipping replacement during a formatting.

After determining the initially assignable spare area size and the PDL entry condition, an SDL entry condition may be set based upon a maximum size of the spare area and the PDL entry condition, or based upon the PDL entry condition and the DMA storage capacity (step 404). In the former case, the maximum size of the spare area may be predetermined based upon the configuration of the optical recording medium. For example, a specific ratio of about 3–5% of the total capacity may be determined as the maximum spare area size. Otherwise, the spare area size required for the worst and best scenarios may first be obtained, and an average of the two spare area sizes may be determined as the maximum spare area size. Still, other methods may be utilized to set the maximum size of the spare area.

In any case, upon determination of the SDL entry condition, a judgment is made whether the maximum spare area size is larger than the size of the initially assignable spare area. If so, a separate supplementary spare area may be additionally assigned, as necessary, during the recording/playback operation (step 405). The supplementary spare area can be assigned near the bottom of the data area as in the 4.7 GB rewritable optical recording medium.

Note that because of the relationship between the initially assignable spare area size and the PDL entry condition, the initially assignable spare area size may be determined after the determination of the PDL entry condition. In such case, the initial recording capacity need not be determined. Instead, the PDL entry condition is first set and a size of a spare area required for the slipping replacement during a formatting is determined based upon the PDL entry condition. Thereafter, the size of the initially assignable spare area is obtained by adding the spare area for the slipping replacement to a spare area required for the linear replacement. Additionally, a defect area size may be pre-estimated and used to check whether the initial spare area size is properly determined.

For purpose of explanation, a method of managing a defect area of a rewritable optical recording medium with a size of 80 mm, for example a DVD-RAM, will next be described with reference to FIG. 4. If the initial recording capacity is determined to be 1.460 GB for the 80 mm optical recording medium in order to maintain compatibility with DVD-ROM, the size of the initially assignable spare area would be about 12 MB considering the track pitch or the physical environment of the disc.

Next, a DMA condition must be applied in order to satisfy the DMA storage capacity. However, an application of the DMA condition, i.e. Equation 1 for the 120 mm rewritable optical medium, to the 80 mm rewritable optical medium may cause problems. For example, a 120 mm rewritable recording medium with an initial recording capacity of 4.7 GB and an initially assignable spare area size of 26 MB requires at least 15 MB of spare area for slipping replacement during formatting. This is because the defect area that one sector of the PDL can manage is 1 MB. As a result, at least 11 MB can be used for linear replacement since the size of the initially assignable spare area is 26 MB.

When the same DMA conditions of Equation 1 ($1 \leq S_{PDL} \leq 15$, $1 \leq S_{SDL} \leq 15$) is applied to a 80 mm rewritable recording medium with an initial recording capacity of 1.460 GB and an initially assignable spare area size of about 12 MB, the spare area size (about 15 MB) for the slipping replacement becomes larger than the initially assignable spare area size. In other words, a minimum size for the linear replacement cannot be obtained with the initially assignable spare area. This complicates the control of the recording/playback of an optical medium. As a result, the conventional DMA condition should not be directly applied to the 80 mm rewritable optical medium.

Thus, a new DMA condition is set for the 80 mm rewritable recording medium. According to the present invention, the PDL entry condition among the DMA condition is first determined. Specifically, the PDL entry condition is set such that a minimum spare area size for linear replacement is left in the initially assignable spare area after the slipping replacement during formatting. In the above case, the slipping replacement area should be less than 12 MB according to the PDL entry condition because the initially assignable spare area was assumed to be about 12 MB. Thus, the $S_{PDL}$ value is required to be larger than 1 but less than 11 as shown in Equation 2.

$$1 \leq S_{PDL} \leq 11 \qquad \text{[Equation 2]}$$

However, a PDL entry condition larger than 1 but less than 8 (or 7) as shown in Equation 3 is more preferable to maintain compatibility with the conventional optical medium.

$$1 \leq S_{PDL} \leq 8 \text{ (or 7)} \qquad \text{[Equation 3]}$$

Thus, in the 120 mm rewritable optical medium having the initial recording capacity of 4.7 GB, the remaining area for the linear replacement after the slipping replacement is about 11 MB. This corresponds to approximately 0.23% (11/4700) of the total capacity (4.7 GB). If the $S_{PDL}$ value is less than 8 in the 80 mm rewritable optical medium having the initial recording capacity of 1.460 GB, the remaining area for linear replacement after slipping replacement becomes about 4 MB which corresponds to approximately 0.27% (4/1460) of the total capacity (1.460 GB). Therefore, the present invention allows a minimum area for the linear replacement in the initially assignable spare area after the slipping replacement.

Upon determining the PDL entry condition, the SDL entry condition is set. As discussed above, the SDL entry condition can be determined using the PDL entry condition and the maximum spare area size, or the PDL entry condition and the DMA storage capacity.

In the first case, if the maximum spare area size is predetermined to be 72 MB and the $S_{PDL}$ value is determined to be less than 8 by the PDL entry condition, the $S_{SDL}$ of the SDL condition should preferably be less than 8 as shown in Equation 4.

$$1 \leq S_{SDL} \leq 8 \qquad \text{[Equation 4]}$$

Therefore, since the PDL can manage 8 MB from the maximum spare area size of 72 MB, leaving 64 MB and since the defect area that one sector of the SDL can manage is 8 MB, the maximum size which can be managed by the SDL becomes 64 MB (8*8) if $S_{SDL}$ is less than or equal to 8. Note that the maximum spare area size of 72 MB corresponds to about 5% (72/1460) of the initial recording capacity. Moreover, when the maximum spare area size is 72 MB and the $S_{PDL}$ value in the PDL entry condition is determined to be less than 7, the $S_{SDL}$ in the SDL entry condition should preferably be less than 8 MB. Here, the remaining 1 MB can be used for defects generated in the spare area.

In the second case, the SDL entry condition may be determined based upon the PDL entry condition and the DMA storage capacity while maintaining compatibility with an optical media with the same format but different size, such as the 120 mm/80 mm DVD-RAM. For example, if the DMA storage capacity is 32 MB, and the $S_{PDL}$ value in the PDL entry condition is determined to be less than 8 MB, the $S_{SDL}$ in the SDL entry condition should preferably be less than 8, as shown in Equation 4. That is, the DMA storage capacity which satisfies the conditions, $1 \leq S_{PDL} \leq 8$, $1 \leq S_{SDL} \leq 8$, is 32 KB ((2048*8)+(2048*8)) which is identical to that of the 120 mm rewritable optical medium. This enables a recording/playback of optical media with the same format but different size in a single system.

Accordingly, an example of the DMA condition of the 80 mm rewritable optical medium, determined through the above process, is expressed in Equation 5, where the $S_{PDL}$ denotes the number of sectors used for maintaining the PDL entries, the $S_{SDL}$ denotes the number of sectors used for maintaining the SDL entries, the $E_{PDL}$ denotes the number of PDL entries, and the $E_{SDL}$ denotes the number of SDL entries.

$$1 \leq S_{PDL} \leq 8 \text{ (or 7)}$$
$$1 \leq S_{SDL} \leq 8 \text{ (or 7)}$$
$$S_{PDL} = [(E_{PDL} \times 4 + 4) + 2047]/2048$$
$$S_{SDL} = [(E_{SDL} \times 8 + 24) + 2047]/2048 \qquad \text{[Equation 5]}$$

If the size of the maximum spare area is larger than the initially assignable spare area, a separate supplementary spare area may be additionally assigned to be used for the linear replacement, as necessary during recording/playback operation. For example, if the maximum spare area size is 72 MB and the initially assignable spare area size is 12 MB, about 60 MB can be additionally assigned.

The additional spare area may be assigned near the bottom of the data area as in the 4.7 GB rewritable optical medium currently being discussed. Accordingly, to record/playback to/from optical discs with the same format and different sizes, the size of the optical disc is judged when an optical disc is loaded (step 501) and the DMA condition corresponding to the judged optical disc is applied to control the recording/playback (step 503), as shown in FIG. 5. Thus, optical discs with the same format and different sizes can be recorded/playback in a single system. Furthermore, the method of the present invention can be applied when the spare area and DMA condition are determined in a large-capacity optical medium (for example, HD-RAM) without any change.

Therefore, in the present method of managing defect areas of an optical medium and method of controlling recording/playback operation, the DMA condition or initially assignable spare area size is determined based upon the interrelation between the spare area size and the DMA condition. At this time, the PDL entry condition among the DMA condition is set such that a minimum spare area for linear replacement remains in the initially assignable spare area after slipping replacement during formatting. This facilitates the control of recording/playback of optical disc and management of its defect area, thereby improving the system performance.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of managing a defect area of an optical medium, the method comprising:

determining a size of an initially assignable spare area and a primary defect list (PDL) entry condition, based upon an interrelation between the initially assignable spare area and the PDL entry condition such that a spare area required for a linear replacement is left in the initially assignable spare area after a slipping replacement; and managing the defect area based upon the determined initially assignable spare area size and the PDL entry condition.

2. A method of claim 1, further comprising:

determining a secondary defect list (SDL) entry condition using the PDL entry condition and a maximum spare area size.

3. A method of claim 2, wherein the maximum spare area size is a predetermined ratio of a total data area capacity of the optical medium.

4. A method of claim 2, wherein the maximum spare area size is determined by averaging a maximum size and a minimum size of a spare area that the PDL entry condition can manage.

5. A method of claim 1, further comprising:

determining a secondary defect data storage (SDL) entry condition using the PDL entry condition and a defect management area (DMA) storage capacity.

6. A method of claim 1, further comprising assigning a supplementary spare area if a maximum size of a spare area is larger than the initially assignable spare area size.

7. An optical medium in which a spare area is assigned by determining a size of an initially assignable spare area and a primary defect list (PDL) entry condition, based upon an interrelation between the initially assignable spare area and the PDL entry condition such that the spare area required for a linear replacement is assigned in the initially assignable spare area after a slipping replacement, whereby a defect area of the optical medium is managed based upon the determined initially assignable spare area size and the PDL entry condition.

8. A method of managing a defect area of an optical medium, the method comprising:

determining a recording capacity of the optical medium, and determining a size of an initially assignable spare area based upon a recording capacity of the optical medium;

determining a primary defect list (PDL) entry condition, such that a spare area for a linear replacement is left in the initially assignable spare area after a slipping replacement; and managing the defect area based upon the determined initially assignable spare area size and the PDL entry condition.

9. A method of claim 8, wherein the step of determining the initially assignable spare area size is performed by subtracting the initial recording capacity from a total data area capacity of the optical medium.

10. A method of claim 8, further comprising:

determining a secondary defect list (SDL) entry condition using the PDL entry condition and a maximum spare area size.

11. A method of controlling recording/playback of an optical media, the method comprising:

judging the type of an optical medium when the optical medium is loaded; and controlling recording/playback of the optical medium based upon a defect management area (DMA) condition of the optical medium type, wherein each optical medium type has a different DMA condition, wherein a primary defect list (PDL) entry condition among the DMA condition is determined such that a spare area for a linear replacement is left in an initially assignable spare area after a slipping replacement during a formatting.

12. A method of claim 11, wherein a secondary defect list (SDL) entry condition among the DMA condition is determined based upon the PDL entry condition and either one of a maximum spare area size or a DMA storage capacity.

13. A method of claim 11, wherein the step of controlling the recording/playback operation is performed such that a number of sectors managed by the primary defect list (PDL) entry condition among the DMA condition does not exceed 11 if the optical medium is a type having a diameter of 80 mm.

14. A method of claim 11, wherein the DMA condition satisfies conditions of $1 \leq S_{PDL} \leq 8$ and $1 \leq S_{SDL} \leq 8$, wherein $S_{PDL}$ denotes the number of sectors used to maintain PDL entries, and $S_{SDL}$ denotes the number of sectors used to maintain SDL entries.

15. A method of claim 11, wherein the DMA condition satisfies conditions of $1 \leq S_{PDL} \leq 7$ and $1 \leq S_{SDL} \leq 7$, wherein $S_{PDL}$ denotes the number of sectors used to maintain PDL entries, and $S_{SDL}$ denotes the number of sectors used to maintain SDL entries.

16. A method of controlling recording/playback of an optical media, the method comprising:

judging the type of an optical medium when the optical medium is loaded; and controlling recording/playback of the optical medium based upon a defect management area (DMA) condition of the optical medium type, wherein each optical medium type has a different DMA condition, wherein the step of controlling the recording/playback operation such that a number of sectors managed by a primary defect list (PDL) entry condition among the DMA condition does not exceed 11 if the optical medium is a type having a diameter of 80 mm.

17. A method of claim 16, wherein a secondary defect list (SDL) entry condition among the DMA condition is determined based upon the PDL entry condition and either one of a maximum spare area size or a DMA storage capacity.

18. A method of controlling recording/playback of an optical media, the method comprising:

judging the type of an optical medium when the optical medium is loaded; and controlling recording/playback of the optical medium based upon a defect management area (DMA) condition of the optical medium type, wherein each optical medium type has a different DMA condition, wherein a secondary defect list (SDL) entry condition among the DMA condition is determined based upon a primary defect list (PDL) entry condition and either one of a maximum spare area size or a DMA storage capacity.

19. An optical medium in which a spare area is assigned by:

determining a recording capacity of the optical medium and determining a size of an initially assignable spare area based upon a recording capacity of the optical medium; and determining a primary defect list (PDL) entry condition such that the spare area for a linear replacement is assigned in the initially assignable spare area after a slipping replacement, whereby a defect area of the optical medium is managed based upon the determined initially assignable spare area size and the PDL entry condition.

\* \* \* \* \*